UNITED STATES PATENT OFFICE.

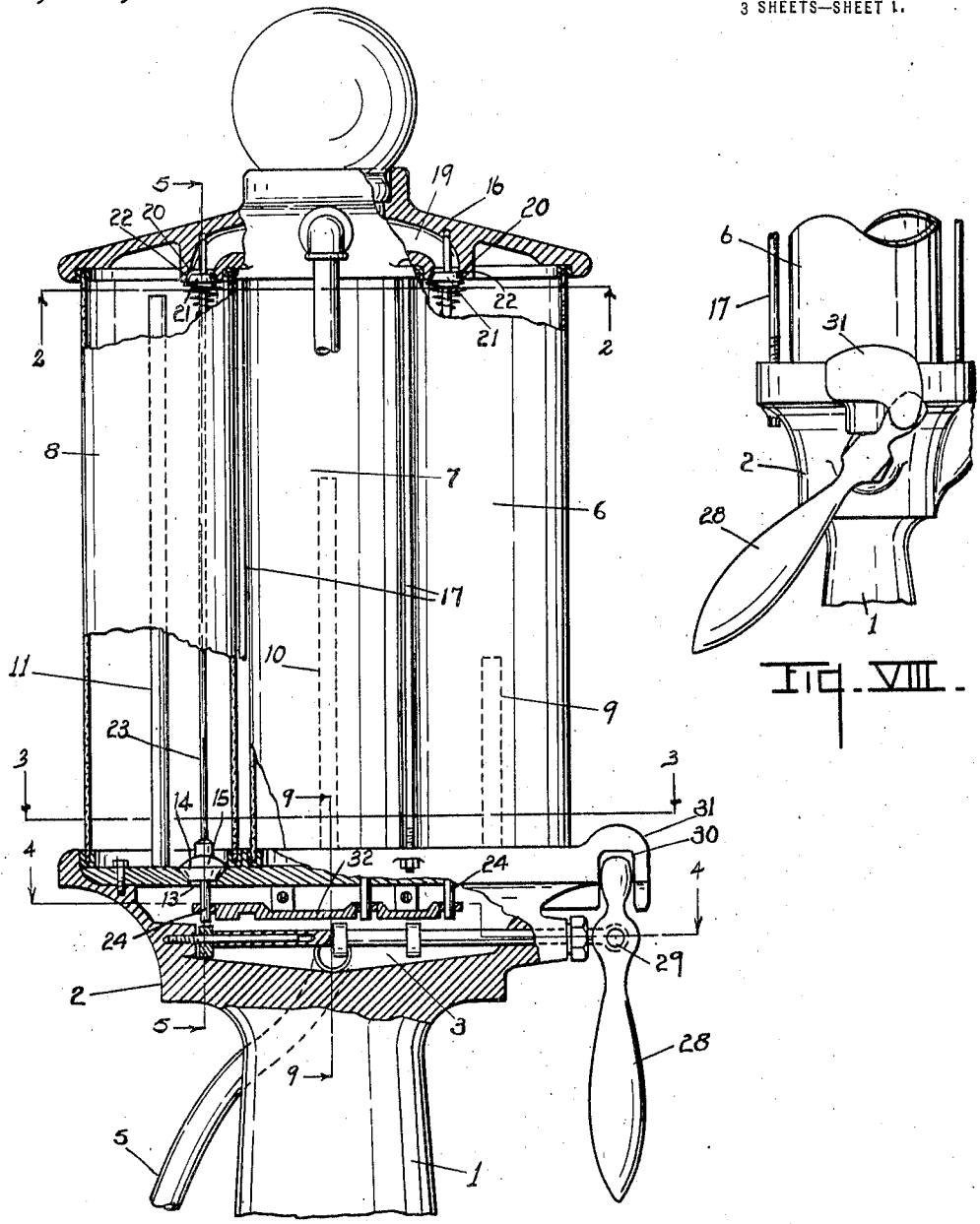

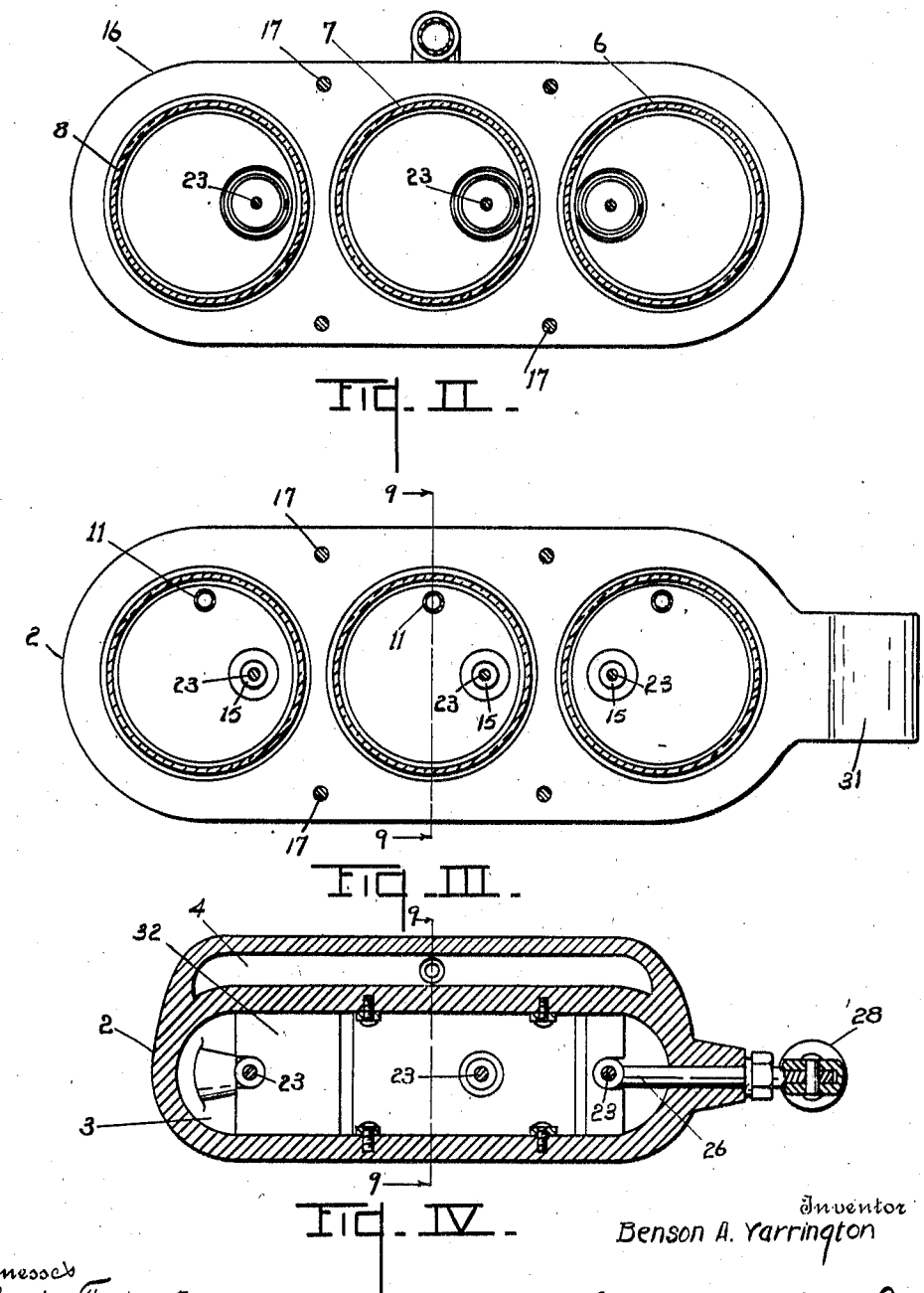

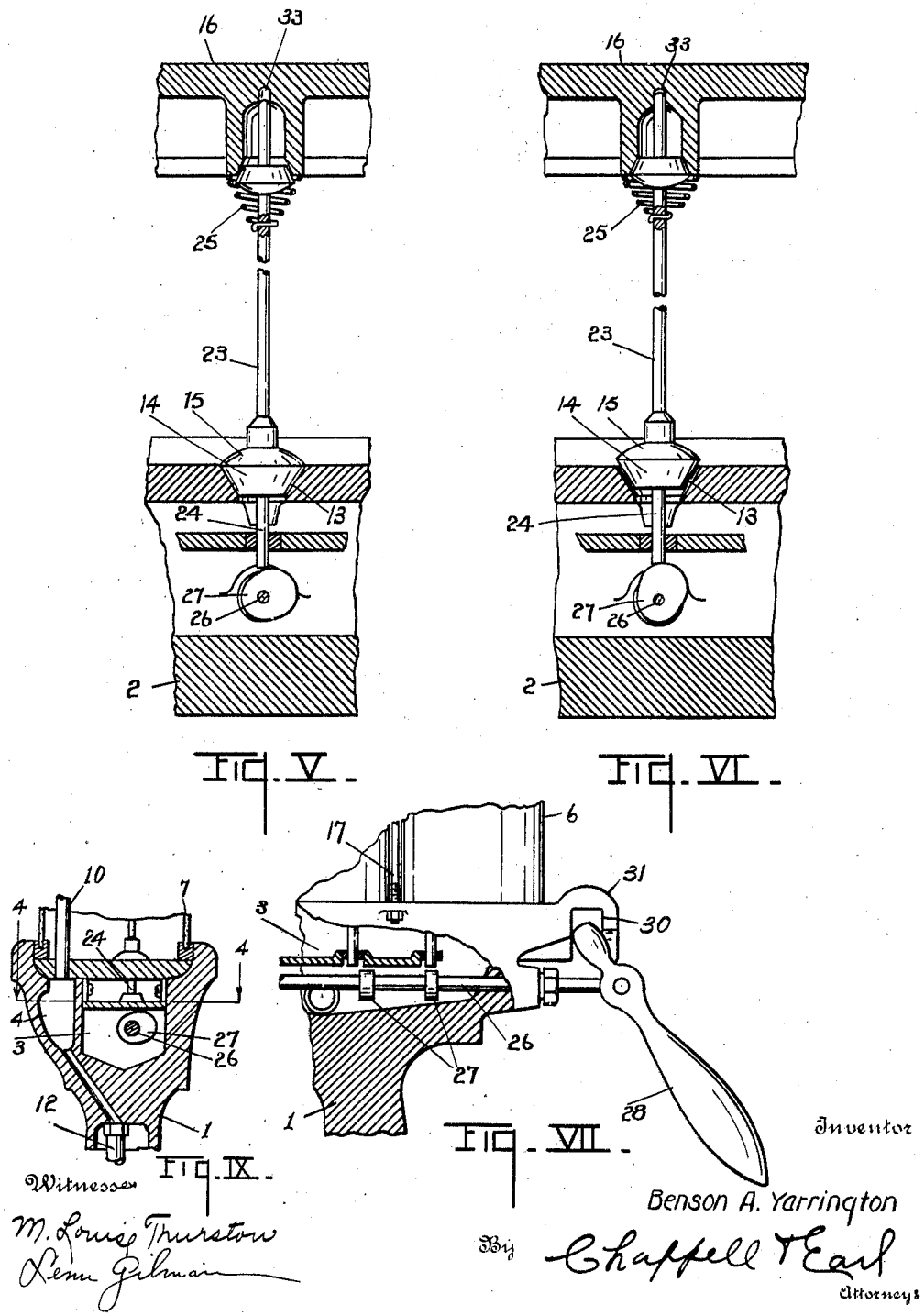

BENSON A. YARRINGTON, OF GRAND RAPIDS, MICHIGAN, ASSIGNOR TO GRAND RAPIDS MANUFACTURING COMPANY, OF GRAND RAPIDS, MICHIGAN.

LIQUID-MEASURING APPARATUS.

1,408,557.    Specification of Letters Patent.    Patented Mar. 7, 1922.

Application filed August 31, 1920. Serial No. 407,130.

*To all whom it may concern:*

Be it known that I, BENSON A. YARRINGTON, a citizen of the United States, residing at Grand Rapids, county of Kent, State of Michigan, have invented certain new and useful Improvements in Liquid-Measuring Apparatus, of which the following is a specification.

This invention relates to improvements in liquid measuring apparatus.

My improved liquid measuring apparatus is especially designed by me for use in dispensing gasolene and I have illustrated the same in an embodiment adapted for that purpose. My improvements are, however, capable of embodiment in structures designed for measuring other liquids, particularly where it is desired to measure different quantities on different occasions.

The main objects of this invention are:

First, to provide an improved liquid measuring apparatus by means of which any desired quantity may be accurately and quickly measured.

Second, to provide an improved measuring or dispensing apparatus having these advantages which is attractive in appearance and at the same time quite simple and economical in structure and convenient to operate.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is an elevation view partially in vertical section, parts being broken away for convenience in illustration.

Fig. II is a horizontal section on a line corresponding to line 2—2 of Fig. I.

Fig. III is a horizontal section on a line corresponding to line 3—3 of Fig. I.

Fig. IV is a horizontal section on a line corresponding to the broken line 4—4 of Fig. I.

Fig. V is an enlarged detail vertical view partially in section on a line corresponding to line 5—5 of Fig. I, showing the discharge valve closed and the inlet valve opened.

Fig. VI is a detail section corresponding to that of Fig. V, showing the discharge valve opened and the inlet valve closed.

Fig. VII is a detail view partially in vertical section showing the adjustment of the valve actuating cam shaft and the selective operation of the valves.

Fig. VIII is a detail elevation looking from the right of Fig. I, illustrating details of the operating means.

Fig. IX is a detail vertical section on a line corresponding to line 9—9 of Fig. IV, showing details of the overflow gaging means.

In the drawing similar reference characters refer to similar parts throughout the several views, and the sectional views are taken looking in the direction of the little arrows at the ends of the section lines.

Referring to the drawing, 1 represents the supporting shaft or pedestal which is provided at its upper end with a receptacle base member 2 having a discharge member 3 therein and an overflow chamber 4. The delivery pipe 5 is connected to this chamber 3.

I provide a plurality of cylindrical receptacle bodies which for convenience I designate by separate numerals as 6, 7 and 8. The receptacles are provided with a bottom plate 8' common to all of them, the bottom plate constituting a top for the discharge and overflow chambers 3 and 4, respectively. The overflow pipes 9, 10 and 11 for the receptacles 6, 7 and 8, respectively, deliver to the overflow chamber 4 which has a return pipe 12 leading to the storage tank or source of supply.

The receptacles are preferably all of the same dimensions, as illustrated. The overflow gage pipes are of different lengths, as illustrated. For instance, they are of such length as to provide receptacles of capacities of one, two and three gallons, respectively.

If desired, the receptacles may be provided with gaging indicia but I have not illustrated the same as its use is well understood.

The receptacle bottom member is provided with ports 13 connecting each receptacle to the discharge chamber. The ports have inwardly facing valve seats 14' with which the discharge valves 15 coact. The top member 16 is common to all of the receptacles. The top member 16 is provided with a passage 19 and with ports 20 connecting the passage with each receptacle. These ports are controlled by the valves 21 coacting with the downwardly facing seats 22.

The inlet and discharge valve seats are arranged in alignment. The pairs of inlet and discharge valves are provided with a stem 23 common to each pair of valves. The stems 23 project at 24 into the discharge chamber.

When a valve stem is raised to open a discharge valve as shown in Fig. VI, the inlet valve is closed, thereby preventing the entrance of any more liquid until the discharge valve 14 is closed, the valve 14 being normally closed while the inlet valve 21 of each receptacle is normally opened as shown in Fig. V.

In order to permit a relatively wide opening of the valve 14, the valve 21 is loosely mounted on the stem, the spring 25 being provided to seat the same on the initial movement of the stem in opening the discharge valve, the spring yielding on further movement of the stem.

For selectively actuating any one of the pairs of valves, I provide a cam-shaft 26 having cams 27 thereon adapted to be brought into alignment with the valve it is desired to actuate by shifting the cam shaft 26, the same being mounted for longitudinal movement so that any desired cam can be aligned with the stem which it is desired to actuate.

The cam shaft is provided with a hand piece 28 pivoted at 29 with the cam shaft and supported at its upper end by engagement with the slot 30 in the projections 31 on the base member, so that the shaft may be rocked or shifted longitudinally by grasping the hand piece 28. The projecting ends 24 of the stems are guided by a guide plate 32 while their upper ends are guided in holes 33 in the top member.

With this arrangement of parts, I provide a measuring apparatus by which the desired quantity may be measured or dispensed, as for instance, in vending gasolene, the receptacles of the structure illustrated being of one, two and three gallon capacities. This may, of course, be varied as desired.

I have illustrated and described my improvements in only one design or embodiment as I believe the disclosure made will enable those skilled in the art to embody or adapt the same as may be desired.

Having thus described my invention, what I claim as new and desire to secure by Letters Patent is:

1. In a structure of the class described, the combination of a base member provided with a discharge chamber and an overflow chamber, a plurality of receptacle bodies of the same length, a bottom member constituting a top for said discharge and overflow chambers and provided with a discharge port for each receptacle and with upwardly facing valve seats for said ports, a top member provided with an inlet passage with an inlet port for each receptacle and with downwardly facing valve seats for said ports, said inlet and discharge ports being aligned, pairs of inlet and discharge valves coacting with said seats and provided with stems common to both arranged to project into said discharge chamber and so that when the discharge valves are open the inlet valves are closed, a valve actuating cam shaft mounted within said discharge chamber for longitudinal adjustment and provided with cams adapted to be brought into position to coact with said valve stems, one at a time, and gaging overflow pipes for said receptacles delivering to said overflow chamber, said pipes being of different lengths.

2. In a structure of the class described, the combination of a base member provided with a discharge chamber and an overflow chamber, a plurality of receptacle bodies of the same length, a bottom member constituting a top for said discharge and overflow chambers and provided with a discharge port for each receptacle and with upwardly facing valve seats for said ports, a top member provided with an inlet passage with an inlet port for each receptacle and with downwardly facing valve seats for said ports, said inlet and discharge ports being aligned, pairs of inlet and discharge valves coacting with said seats and provided with stems common to both arranged to project into said discharge chamber and so that when the discharge valves are open the inlet valves are closed, a valve actuating cam shaft mounted within said discharge chamber for longitudinal adjustment and provided with cams adapted to be brought into position to coact with said valve stems, one at a time, and gaging overflow pipes for said receptacles delivering to said overflow chamber.

3. In a structure of the class described, the combination of a base member provided with a discharge chamber and an overflow chamber, a plurality of receptacle bodies of the same length, a bottom member constituting a top for said discharge and overflow chambers and provided with a discharge port for each receptacle and with upwardly facing valve seats for said ports, a top member provided with an inlet passage with an inlet port for each receptacle and with downwardly facing valve seats for said ports, said inlet and discharge ports being aligned, pairs of inlet and discharge valves coacting with said seats and provided with stems common to both arranged so that when the discharge valves are open the inlet valves are closed, means for selectively actuating said valves, and gaging overflow pipes for said receptacles delivering to said overflow chamber, said pipes being of different lengths..

4. In a structure of the class described, the combination of a base member provided with a discharge chamber, a plurality of receptacle bodies of the same length, a bottom member constituting a top for said discharge chamber and provided with a discharge port for each receptacle and with upwardly facing valve seats for said ports, a top member provided with an inlet passage with an inlet port for each receptacle and with downwardly facing valve seats for said ports, said inlet and discharge ports being aligned, pairs of inlet and discharge valves coacting with said seats and provided with stems common to both arranged to project into said discharge chamber and so that when the discharge valves are open the inlet valves are closed, and a valve actuating cam shaft mounted within said discharge chamber for longitudinal adjustment and provided with cams adapted to be brought into position to coact with said valve stems, one at a time.

5. In a structure of the class described, the combination of a plurality of receptacles having inlet ports at the top and discharge ports at the bottom disposed in alignment, oppositely seating valves for said ports provided with a stem common to both so that when the discharge valves are open the inlet valves are closed, and a valve actuating cam shaft mounted for longitudinal adjustment and provided with cams adapted to be selectively brought into position to coact with said valve stems one at a time.

6. In a structure of the class described, the combination of a plurality of receptacles, inlet and discharge valves therefor provided with stems common to both so that when the discharge valves are open the inlet valves are closed, means for selectively actuating said discharge valves, and gaging overflow pipes for said receptacles, said pipes being of different lengths.

7. In a structure of the class described, the combination of a plurality of receptacles, inlet and discharge valves therefor provided with stems common to both so that when the discharge valves are open the inlet valves are closed, and a valve actuating cam shaft provided with cams spaced so that when one cam is in operative relation to one valve the other cams are in inoperative position relative to the other valves so that the cams may be selectively brought into position to coact with said valves one at a time and any selected valve operated repeatedly or alternately with any other valve.

8. In a structure of the class described, the combination of a plurality of receptacles of different capacities, discharge valves therefor, and a valve actuating cam shaft mounted for longitudinal adjustment and provided with cams spaced so that when one cam is in operative relation to one valve the other cams are in inoperative relation to the other valves whereby the cams may be selectively brought into position to coact with said valves one at a time and any selected valve operated repeatedly or alternately with any other valve.

9. In a structure of the class described, the combination of a plurality of receptacles of different capacities, discharge valves therefor, and an operating means for said valves adjustable to coact with any one of them independently of the others whereby any selected valve may be repeatedly operated or alternately operated with any other valve.

10. In a structure of the class described, the combination of a plurality of receptacles of different capacities, connected inlet and discharge valves therefor arranged so that when the discharge valves are open the inlet valves are closed, the inlet valves being normally open, and an operating means for said valves adjustable to coact with any one of them independently of the others whereby any selected valve may be repeatedly operated or alternately operated with any other valve.

In witness whereof, I have hereunto set my hand and seal in the presence of two witnesses.

BENSON A. YARRINGTON. [L. S.]

Witnesses:
GRACE B. THOMPSON,
LORENA G. SUMMERS.